Aug. 8, 1939.    K. E. BEMIS    2,168,390
MEAT CARRIER FOR MEAT COOKING DEVICES
Filed April 19, 1938
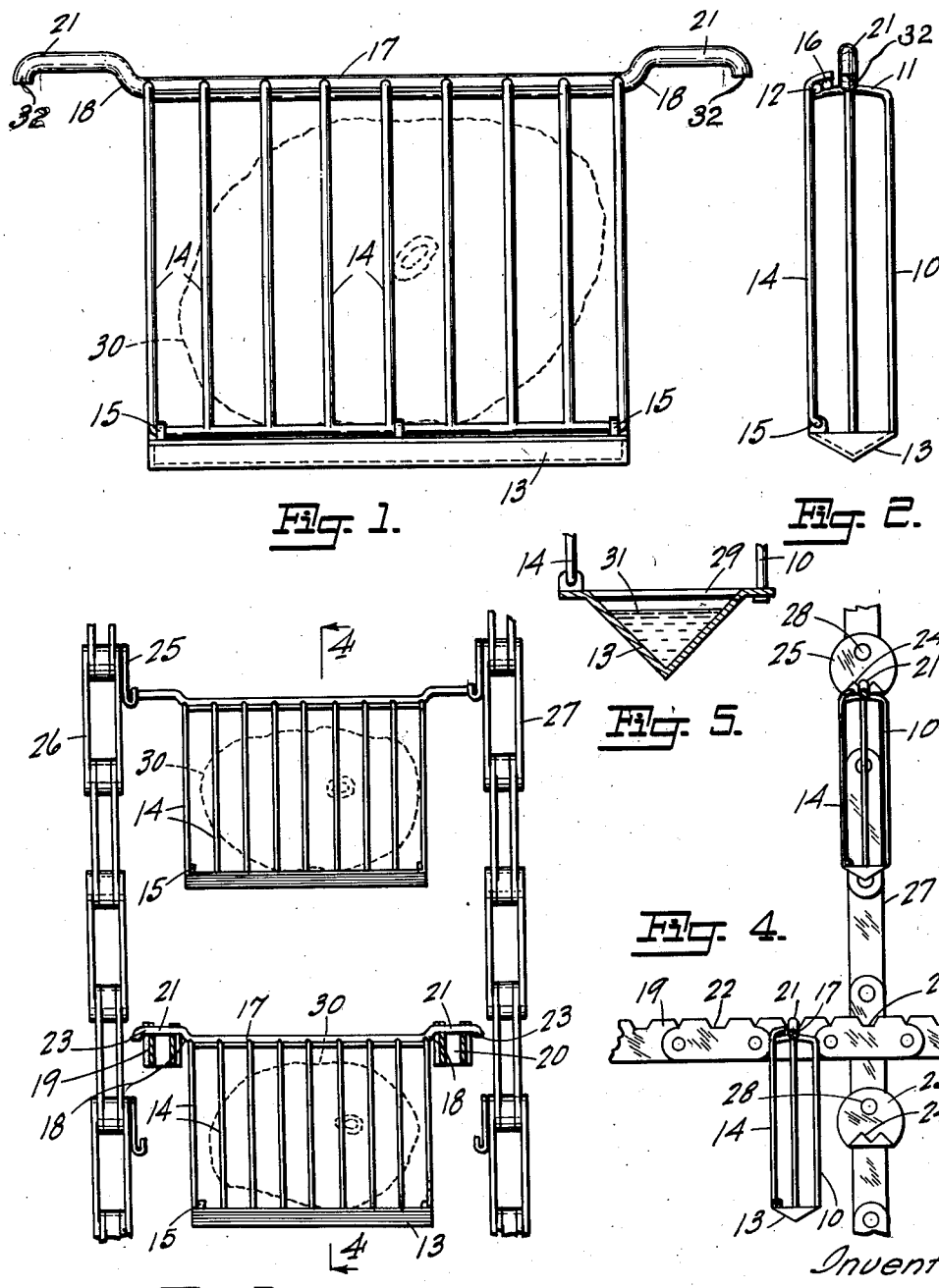

Patented Aug. 8, 1939

2,168,390

UNITED STATES PATENT OFFICE 2,168,390

MEAT CARRIER FOR MEAT COOKING DEVICES

Kenneth E. Bemis, Oakland, Calif.

Application April 19, 1938, Serial No. 202,911

5 Claims. (Cl. 53—5)

This invention, a meat carrier, is primarily intended for supporting comparatively thin cuts of portions of meat in a vertical or edgewise position, so that they may be carried in a vertical or substantially vertical path between heating units to simultaneously subject both sides of the meat to a braising heat, and also to permit ready drainage of exuded juices from the meat and keep the meat out of the exuded juices and, the carrier also incorporates a receptacle for collecting the juices and prevent their dripping onto other portions of meat during the cooking process, as well as for saving the juices for making gravies.

It is the purpose of this invention to provide supporting means for meat cuts preferably not over an inch in thickness and to support the cut between grids which actually clamp the cut on its opposite faces and support it vertically, or as alternatively defined, on edge, so that the cut can be carried in a vertical path between heating units for simultaneously braising or searing of both sides of the meat, and to facilitate drainage of juices which may exude from the meat, and to collect such juices.

In describing the invention, reference will be made to the accompanying drawing forming a part of this specification, and in which:

Fig. 1 is a front elevation of the invention.

Fig. 2 is a side elevation of Fig. 1.

Fig. 3 is a fragmentary front elevation of the invention as supported by cooperative vertical and horizontal conveyors for automatic feeding.

Fig. 4 is a section taken on line 4—4 of Fig. 3, and,

Fig. 5 is an enlarged fragmentary section of the juice collecting receptacle modified by incorporation of a support grid over the receptacle to keep the edge of the meat cut out of the collected juices.

The invention consists of a basket or carrier of the open grid type having a back consisting of wires or rods 10 which continue to form the top 11 and which terminate at and are connected to a latch bar 12, the lower ends of the rods 10 being fixedly connected to a receptacle 13 which is coextensive with, and forms the bottom of the carrier.

A front grid formed of rods 14 is hingedly connected to the front edge of the receptacle 13 as indicated at 15, and the upper ends of these rods are all connected to a latch rod 16 and which is adapted to latch over the rod 12 as is clearly illustrated in Fig. 2, and this latch is readily released by pressing down on the top 11.

A carrier arm 17 is secured intermediate the depth of the top 11 and extends beyond both ends, continuing into a diagonal portion 18 to cause centering of the carrier between the horizontal conveyor chains 19 and 20, and terminating in horizontally-projecting fingers 21 for cooperation with recesses 22 formed in or on the chains 19 and 20, and projecting beyond these chains as indicated at 23 for cooperation with the V-slots 24 formed in the carrier attachments 25 which are pivoted to the vertical chains 26 and 27 as indicated at 28, whereby the carrier is transported by the vertical conveyor 26, 27 in a hanging position and is readily picked up thereby from, and deposited on, the horizontal conveyor 19, 20.

It will be understood that other types of supporting means, such as hooks or bails (not shown) may be substituted for the arm 17, 18, 21, particularly when the carriers are to be supported by a single chain.

In the modification, Fig. 5, cross-bars 29 forming a grid at the top of the receptacle 13, are provided to obviate any possibility of the lower edge of the meat 30 from associating with the collected juices 31.

This carrier can be made in various sizes to suit the cuts of meat to be cooked, and the space between the front and back grids should be such as to fully support the cuts of meat edgewise for simultaneous and equal intensity of cooking of both sides of the meat.

In operation, the front 14 is unlatched and opened, the carrier is laid flat on its back, the cut of meat laid thereon and the front closed and latched, and after suitable seasoning, the carrier with its cut of meat is suspended in the horizontal conveyor, or in the absence of the horizontal conveyor, is suspended directly on the vertical conveyor as illustrated in Figs. 3 and 4; or in the absence of conveyors, the carrier is hung in cooking position between heating units for cooking.

After cooking is completed, the receptacle 13 is first emptied, the front opened and the meat removed; the receptacle having caught and retained all of the juices rejected by the meat with the exception of watery juices which have been vaporized.

When there is insufficient safe support, as when spreading of the conveyor chains can occur, the horizontally-projecting fingers 21 are provided with self-securing terminal ends, as by bending down the ends of the fingers as shown at 32, this hooked portion maintaining the spacing of the chains as also preventing the fingers from slipping out of supported engagement with the carrier attachments 25.

The following copending applications are related to this application; Barbecue furnace, Serial Number 181,517, filed December 24, 1937, as a hand fed oven; Baking and cooking oven, Serial Number 202,912 filed April 19, 1938; Process of cooking meats, Serial Number 202,913 filed April 19, 1938; Barbecue machine, Patent No. 2,138,813, issued December 6, 1938; in connection with all of which this invention can be used.

Variations in construction and arrangement of parts, which variations are consistent with the appended claims, may be resorted to without detracting from the spirit or scope of the invention or sacrificing any of the advantages thereof.

I claim:

1. A meat carrier comprising two closely related grids to support a cut of meat edgewise when the carrier is suspended, a supporting arm projecting longitudinally from each end of the upper portion of the carrier for interposed straddling suspended support of the carrier, said carrier terminating at its lower end in a receptacle for reception and collection of juices exuded by the meat during cooking.

2. A meat carrier comprising two closely related grids to support a cut of meat edgewise when the carrier is suspended by its top, said carrier terminating at its lower end in a receptacle for reception and collection of juices exuded by the meat during cooking; a carrier arm extending throughout the width of the top and projecting from both sides, continuing into a diagonal centering portion and terminating in support fingers for suspended support of the carrier.

3. A meat carrier comprising front and rear grids hingedly connected and a receptacle for juices mounted at the bottom end thereof, carrier arms projecting beyond both ends of the carrier for suspended support of the carrier between straddling supporting devices, and means for releasably latching said grids in parallel spaced relation with the spacing arranged to clamp a cut of meat therebetween, whereby the meat is supported edgewise when the carrier is suspended by its upper end, and exuded juices are drained to and retained by said receptacle.

4. A meat carrier comprising two closely related grids to support a cut of meat edgewise when the carrier is suspended by its top, said carrier terminating at its lower end in a receptacle for reception and collection of juices exuded by the meat during cooking; a carrier arm extending throughout the width of the top and projecting from both sides, continuing into a diagonal centering portion and terminating in support fingers for suspended support of the carrier; said support fingers terminating in hooked ends for securing said fingers against release from supporting means.

5. A meat carrier comprising front and rear grids hingedly related and terminating at their lower ends in a receptacle for juices, and means for releasably latching said grids in parallel spaced relation with the spacing arranged to clamp a cut of meat therebetween, whereby the meat is supported edgewise when the carrier is suspended at its upper end, and exuded juices are drained to and retained by said receptacle; suspending means associated with the upper end of said carrier for supporting said carrier in depending position, and comprising an arm projecting from each end of the carrier, and being initially upwardly inclined and continuing into a straight horizontal supporting finger terminating in a downwardly bent portion forming a hook.

KENNETH E. BEMIS.